(12) United States Patent
Kerrigan et al.

(10) Patent No.: US 11,259,373 B2
(45) Date of Patent: Feb. 22, 2022

(54) STREETLIGHT ASSET MODULE, STREETLIGHTS AND RELATED SYSTEMS

(71) Applicant: SELC Ireland Ltd., Dublin (IE)

(72) Inventors: William John Kerrigan, Navan (IE); Francis Joseph Magee, Trim (IE); John Martin Power, Dublin (IE)

(73) Assignee: SELC IRELAND LTD., Dublin (IE)

( * ) Notice: Subject to any disclaimer, the term of this patent is extended or adjusted under 35 U.S.C. 154(b) by 212 days.

(21) Appl. No.: 16/553,594

(22) Filed: Aug. 28, 2019

(65) Prior Publication Data

US 2020/0077482 A1 Mar. 5, 2020

Related U.S. Application Data

(60) Provisional application No. 62/727,099, filed on Sep. 5, 2018.

(51) Int. Cl.
*H05B 47/10* (2020.01)
*H05B 45/10* (2020.01)
*G08B 23/00* (2006.01)
*H05B 47/19* (2020.01)
*H05B 47/105* (2020.01)

(52) U.S. Cl.
CPC ............. *H05B 45/10* (2020.01); *G08B 23/00* (2013.01); *H05B 47/105* (2020.01); *H05B 47/19* (2020.01)

(58) Field of Classification Search
CPC ........ H05B 45/00; H05B 45/10; H05B 47/10; H05B 47/19; H05B 47/105; G08B 23/00
See application file for complete search history.

(56) References Cited

U.S. PATENT DOCUMENTS

| | | | |
|---|---|---|---|
| 8,140,276 B2 | 3/2012 | Walters et al. | |
| 8,290,710 B2 | 10/2012 | Cleland | |
| 8,442,785 B2 | 5/2013 | Walters et al. | |
| 8,588,942 B2 | 11/2013 | Agrawal | |
| 8,594,976 B2 | 11/2013 | Dorogi et al. | |
| 8,694,256 B2 | 4/2014 | Cleland et al. | |
| 8,820,952 B2 | 9/2014 | Agrawal | |
| 9,253,853 B2 | 2/2016 | Schroder et al. | |
| 10,448,487 B2 * | 10/2019 | Den Boer | H05B 47/19 |
| 2013/0057158 A1 * | 3/2013 | Josefowicz | H05B 47/22 315/152 |
| 2017/0336061 A1 | 11/2017 | Riedel et al. | |
| 2018/0035517 A1 | 2/2018 | Den Boer et al. | |

OTHER PUBLICATIONS

Notification of Transmittal of the International Search Report and the Written Opinion of the International Searching Authority, or the Declaration, PCT/US2019/073555, dated Nov. 5, 2019, 12 pages.

* cited by examiner

*Primary Examiner* — Jimmy T Vu
(74) *Attorney, Agent, or Firm* — Lee & Hayes, P.C.

(57) ABSTRACT

A streetlight asset module (SAM) is provided including at least one memory block configured to store operating configuration settings of a streetlight associated with the SAM. The SAM is configured to communicate the operating configuration settings of the streetlight to a control and monitoring system (CMS) node coupled to the streetlight. The CMS node is configured to communicate the operating configuration settings to a remote location using a radio communications network. Related streetlights and systems are also provided.

20 Claims, 8 Drawing Sheets

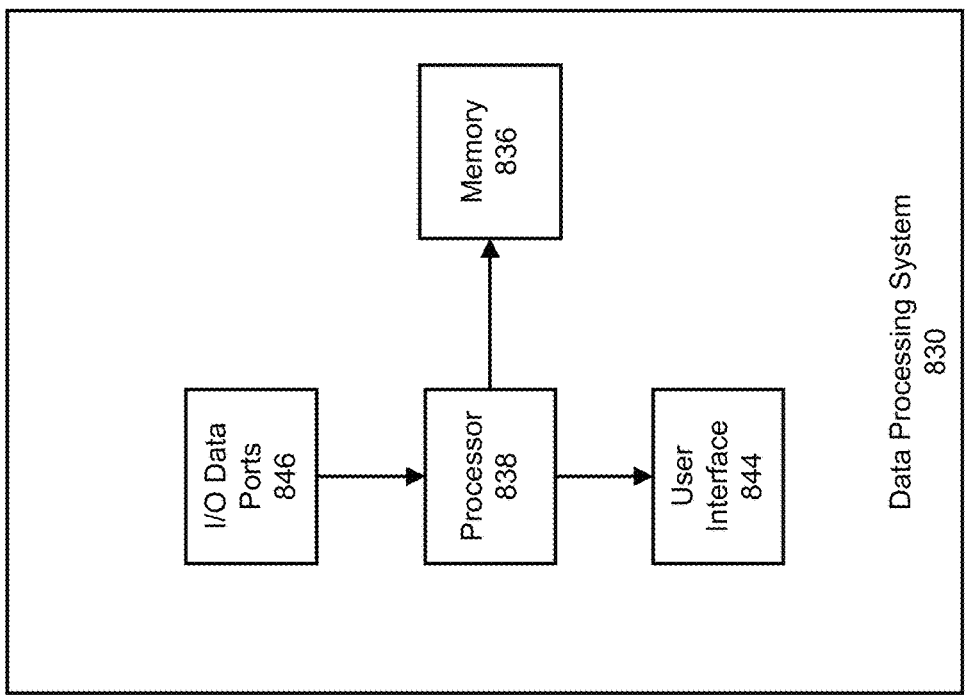

STREETLIGHT ASSET MODULE, STREETLIGHTS AND RELATED SYSTEMS

CLAIM OF PRIORITY

The present application claims priority to U.S. Provisional Application Ser. No. 62/727,099, filed Sep. 5, 2018, entitled Streetlight Asset Module, the content of which is hereby incorporated herein by reference as if set forth in its entirety.

FIELD

The present inventive concept relates generally to streetlights, and, more particularly, to identification of details associated with particular streetlights.

BACKGROUND

Using control and monitoring systems (CMSs) in street lighting is becoming the standard in the industry. Conventional streetlights typically have a CMS node attached to a streetlight that is connected in real time to some sort of radio communications network. Inclusion of communications functionality in the streetlight allows the streetlights to be monitored remotely. For example, information from the streetlights can be used to monitor for faults or incorrect operation and a network manager may be alerted; to control if the streetlight is on or off based on calendar time or daylight levels or a pre-programmed schedule; to measure the power consumed by the streetlight to meter grade accuracy; to detect, for example, vehicular or pedestrian traffic adjacent to the streetlight and increase or decrease the brightness of the streetlight based on traffic patterns; to use satellite location to calculate the exact location of the streetlight and the like. Thus, information from conventional street lights can be used to determine what time it is at the location of the streetlight; physically where the streetlight is located; whether it is day or night; how much power the streetlight is consuming; how bright the light is; if there is traffic active in the vicinity of the streetlight and if the streetlight is functioning properly.

SUMMARY

Some embodiments of the present inventive concept provide a streetlight asset module (SAM) including at least one memory block configured to store operating configuration settings of a streetlight associated with the SAM. The SAM is configured to communicate the operating configuration settings of the streetlight to a control and monitoring system (CMS) node coupled to the streetlight. The CMS node is configured to communicate the operating configuration settings to a remote location using a radio communications network.

In further embodiments, the CMS node may be further configured to monitor operation of the streetlight associated with the SAM based on the operating configuration settings provided from the SAM; and provide alerts using a communication circuit to the remote location when a deviation from the operating configuration settings is identified.

In still further embodiments, the at least one memory block may be programmed with the operating configuration settings of the streetlight at time of manufacture.

In some embodiments, the operating configuration settings stored in the at least one memory block may be periodically updated or updated upon request from a user.

In further embodiments, the SAM may be coupled to a dimming lamp driver in the streetlight and configured to communicate dimming control commands from the CMS node to the dimming lamp driver.

In still further embodiments, the SAM may be coupled to at east one external sensor and may be configured to provide sensor information from the at least one external sensor to CMS node. In certain embodiment, the at least one external sensor may include at least one of a temperature sensor, a traffic, counter, a humidity sensor and a motion sensor.

Some embodiments of the present inventive concept provide a streetlight including a streetlight asset module (SAM) comprising at least one memory block configured to store operating configuration settings of the streetlight; and a coupling mechanism configured to connect the streetlight to a control and monitoring (CMS) node. The SAM is configured to communicate the operating configuration settings of the streetlight to the CMS node. The CMS node is configured to communicate the operating configuration settings to a remote location using a radio communications network.

Further embodiments of the present inventive concept provide a system for monitoring operating configuration settings of a streetlight including a streetlight asset module (SAM) comprising at least one memory block configured to store, operating configuration settings of the streetlight and a control and monitoring (CMS) node in communication with the SAM and configured to receive the operating configuration settings of the streetlight from the SAM. The CMS node is configured to communicate the operating configuration settings to a remote location using a radio communications network.

BRIEF DESCRIPTION OF THE DRAWINGS

FIG. 8 is a block diagram of a data processing system that may be used in accordance with some embodiments of the present inventive concept.

DETAILED DESCRIPTION

Figure 1:
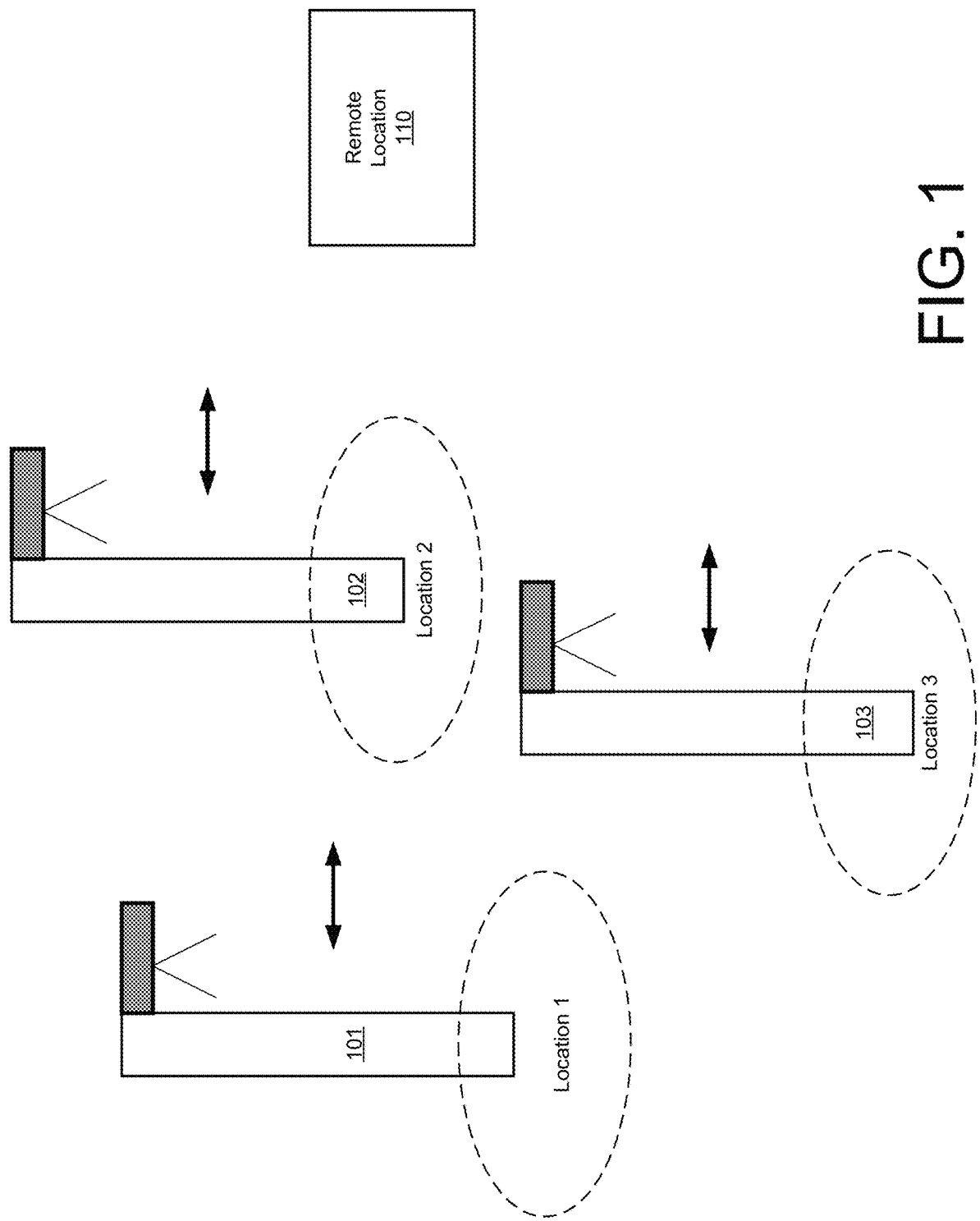
FIG. 1 is a diagram of an environment including streetlights in various locations that communicate with a remote location in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, conventional streetlights are equipped with communication circuits that allow the streetlights to communicate information to remote locations. Thus, it is possible to determine what time it is at the location of the streetlight; physically where the streetlight is located; whether it is day or night; how much power the streetlight is consuming; how bright the light is; if there is traffic active in the vicinity of the streetlight and if the streetlight is functioning properly; and the like from the remote location. All these useful features as previously described have been added to the streetlight over recent years by plugging a smart control node into a standard socket fitted in the streetlight. The capabilities of standard streetlights have developed in the last decade, from a sodium vapour lamp light source to a white vapour lamp light source and now to a light emitting diode (LED) light source, thus, improving the efficiency of the lighting. The features of the lamp driver have generally remained unchanged relative to the type of light source. Generally, the lamp driver controls whether light is on or off and the dimming of the light.

Referring to FIG. 1, a diagram illustrating an example environment including various streetlights 101, 102 and 103 in various locations 1, 2 and 3 in communication with a remote location 110 will be discussed. As illustrated in FIG. 1, the streetlight 101, 102 and 103 are positioned in different locations 1, 2, and 3 respectively. Each of the streetlights 101, 102 and 103 is coupled to a CMS node that allows the streetlights 101, 102 and 103 to communicate with the remote location 110, for example, a utility. It will be understood that although a single remote location, three streetlights and three locations are illustrated in FIG. 1, embodiments of the present inventive concept are not limited to this configuration. There could be more or less of each without departing from the scope of the present inventive concept.

As illustrated, physically, each of the streetlights 101, 102 and 103 look the same. However, each of these streetlights 101, 102 and 103 are positioned in different locations 1, 2 and 3, respectively. The locations 101, 102 and 103 may require different types of lighting. For example, location 1 may be in a residential neighbourhood, location 2 may be a highway and location 3 may be in a parking lot of grocery store. Each of these locations have different illumination needs and the streetlights 101, 102 and 103 are configured to fulfil these needs. However, it is not clear from looking at the streetlights 101, 102 and 103 themselves as to what the specific requirements are. In other words, the streetlights 101, 102 and 103 all start with a same or similar piece of equipment and are programmed and configured for different operating conditions. It is widely understood that customers each have their own specific set of "conditions" and it would be very difficult to provide a different physical product to meet each customer's needs.

To effectively control the streetlights 101, 102 and 103 from the remote location 110, the details associated with each should be understood. As discussed above, although conventional streetlights can communicate the information discussed above, they generally lack the ability to communicate the "type" associated with the streetlight. As used herein, "type" refers to the individual details associated with the specific streetlight beyond the physical structure thereof. For new installations, the lighting network is carefully designed so that the light level all along the street and pavement satisfies the safety requirements currently in force at that time. In order to achieve this, each streetlight is chosen to provide the correct level of lighting as required and the dimming profile applied to the CMS node over the network is designed to match the intended location and power level of the streetlight. The problem occurs if the streetlight is not fitted to the correct location. If a lower power unit is fitted in lieu of a higher powered alternative, the illumination on the street may be unsafe. Similarly, if a higher power unit is fitted rather than a lower power alternative, the illumination level will be too high causing unsafe glare for road users and excessive power consumption. Furthermore, the CMS node can monitor the operation of the streetlight and send alarm warnings if the streetlight is not operating as expected and needs repair. If the CMS node does not know what "type" (details) of light is communicating, the CMS node may not know the normal operating conditions for the streetlight. The quality of the information provided by the CMS node and the warnings generated therefrom are only as good as the information available to the CMS node.

Information related to the streetlight, such as "type" may be recorded, at the time of installation. However, having installers just make a notation of "type" for each streetlight installed and the coordinates for the location of each streetlight has proven to be an unsuccessful solution. The data collected can be very poor quality unless a separate administration team is used to track the installation of the streetlights. Using a separate team results in a significant install cost increase per streetlight.

Human error is further enhanced when streetlights are fixed in emergency situations. For example, after hurricane season in the areas prone to such events, many thousands of streetlights have to be repaired manually. This is generally done with emergency crews and the goal is to replace the broken lighting as quickly as possible and these crews have neither the equipment, training or motivation to accurately record the relevant data associated with each streetlight ("asset data"). Thus, every year thousands of lights are fitted and the details with respect to the lights are sketchy at best. Furthermore, even if the information could be collected accurately, the information has to be processed and transferred into the CMS system for the streetlights.

When the streetlight is manufactured, the information about the streetlight, for example, power consumption, voltage rating, product name, date of manufacture and the like, is stored inside the streetlight and it is made accessible to the CMS node to read and/or transfer through the communications network into the CMS system.

To provide for a standardized platform to develop a solution American National Standards Institute (ANSI) is working on a standard (C137.4) to define what information should be stored for each streetlight and where it can be stored. Storage has been allocated inside a memory block in an LED Driver that has a Dali communications interface. The Dali communications standard already defines the structure of memory blocks inside the LED Driver and also defines a standard method to write to and read from these memory blocks. The ANSI C147.4 standard is proposing is to define the specific streetlight data stored in one or more of these memory blocks in specific locations so that it will be common for all manufacturers.

Although this solution may work for newly manufactured streetlights, most existing Led Drivers in streetlights do not have a Dali communications feature therein. Furthermore, those that do have the Dali communications feature generally do not support writable memory blocks. Of the LED Drivers that have the ability to be "dimmed" most of these currently have 0-10V dimming control because they are more cost effective, about 20 percent cheaper than the equivalent Dali enabled driver. Accordingly, unless the manufacturers can convince their preferred LED Driver manufacturers to develop new units with these added features at little increased cost, this feature may not be available from most existing streetlights.

Accordingly, some embodiments of the present inventive concept provide a relatively small, robust streetlight asset module (SAM) that is configured to communicate with the CMS node using the Dali standard (or alternative communications method). The streetlight asset module in accordance with embodiments discussed herein include (among other things) memory blocks that can be written to by, for example, the manufacturer to store the pertinent "operating configuration settings" in the memory block when the streetlight is being assembled.

Figure 2:
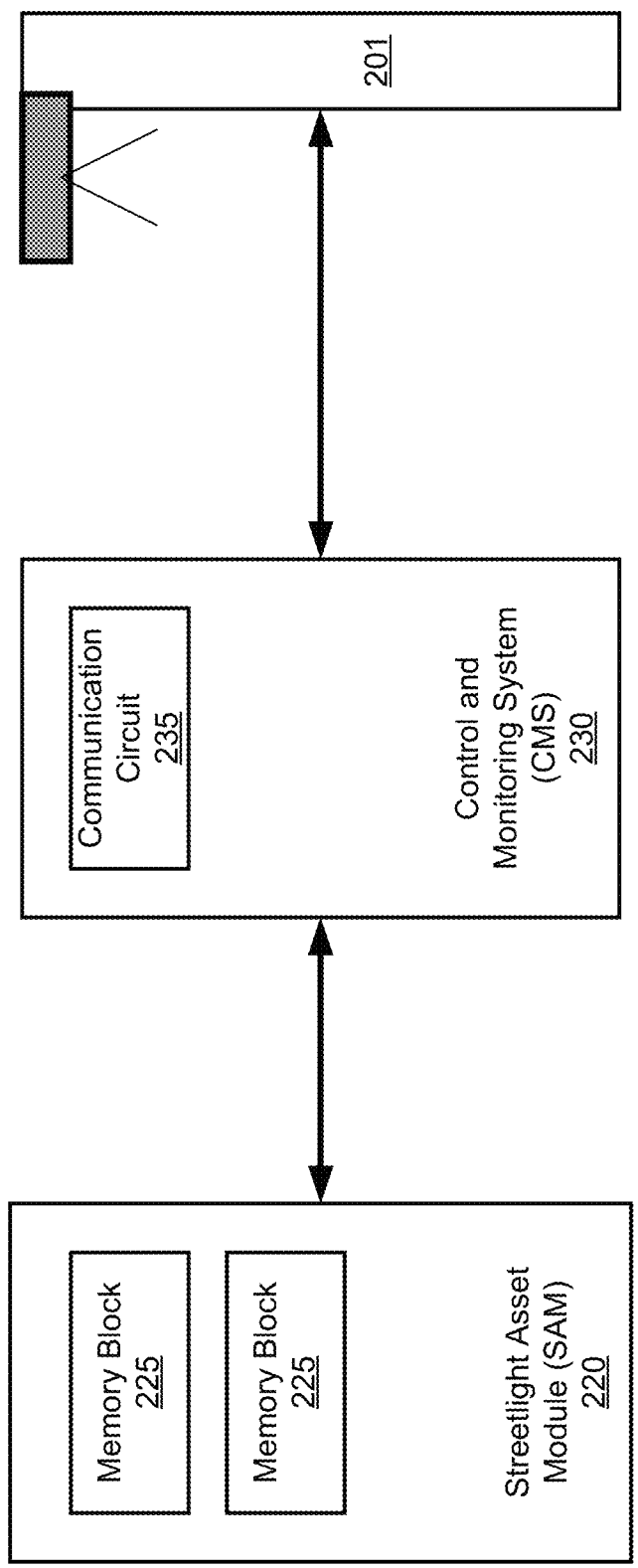
FIG. 2 is a high-level block diagram of a system including a streetlight asset module (SAM), a control monitoring system (CMS) and a streetlight in accordance with some embodiments of the present inventive concept.

Referring now to FIG. 2, a simplified diagram of a SAM in communication with a CMS node in accordance with some embodiments of the present inventive concept will be discussed. As illustrated, the SAM 220, the CMS node 230 and the streetlight 201 communicate with one another. As illustrated in FIG. 2, the SAM 220 includes one or more memory blocks 225 that are configured to store the various details associated with the particular streetlight 201. As will be discussed further below, the SAM 220 may be a small unit/module that is wired to the streetlight 201. In some embodiments, it may be no bigger than 2×2×1 inches, however, embodiments of the present inventive concept are not limited to this configuration. Thus, the SAM 220 in accordance with embodiments of the present inventive concept may be an accessory/add on plugged into an existing physical streetlight 201, which is more cost effective than replacing the entire streetlight. Furthermore, the ability to reprogram and/or replace this accessory makes any necessary updates to the details therein relatively straight forward. The details associated with the particular streetlight 201 may be communicated to a remote location using the communications circuit 235 of the CMS node 230. As discussed above, these details may be used at the remote location to monitor for faults or incorrect operation of the streetlight 201.

The SAM 220 in accordance with embodiments of the present inventive concept may be used with many different physical streetlights including older streetlights that do not have a Dali interface and the most technologically advanced streetlights. Various embodiments of the SAM 220 will be discussed below with respect to FIGS. 3 through 7. However, it will be understood that embodiments of the present inventive concept are not limited to the examples illustrated therein. The SAM 220 may be used in any suitable streetlight configuration without departing, from the scope of the present inventive concept. For example, if a CMS node of a particular streetlight has the capability to provide a Dali only interface for dim control, a 0-10V dimming, control interface may be added to the SAM 220 in accordance with embodiments discussed herein to allow the CMS node to read the asset data using the Dali interface and also send dim commands over the Dali interface that will be converted to 0-10V dim control signal in the streetlight asset module to control a 0-10V dim Driver.

Furthermore, if connection to external sensors in the streetlight CMS network is needed, other communication capabilities may be added to the SAM 220 in accordance with embodiments discussed herein to allow non-standard devices to interface with the standardized CMS Node interface ANSI C146.10. Wireless communications methods, such as Bluetooth, Zigbee, Wi-Fi and the like, may be incorporated into a SAM 220 along with wired interfaces, such as industrial standard RS422/485, RS232, Modbus, Canbus and the like, without departing from the scope of the present inventive concept.

Referring now to FIGS. 3 through 7, embodiments of SAMs 220 in accordance with some embodiments of the present inventive concept will be discussed. The examples discussed herein illustrate how a SAM 220 in accordance with embodiments discussed herein could be configured for different types of physical streetlights.

Figure 3:
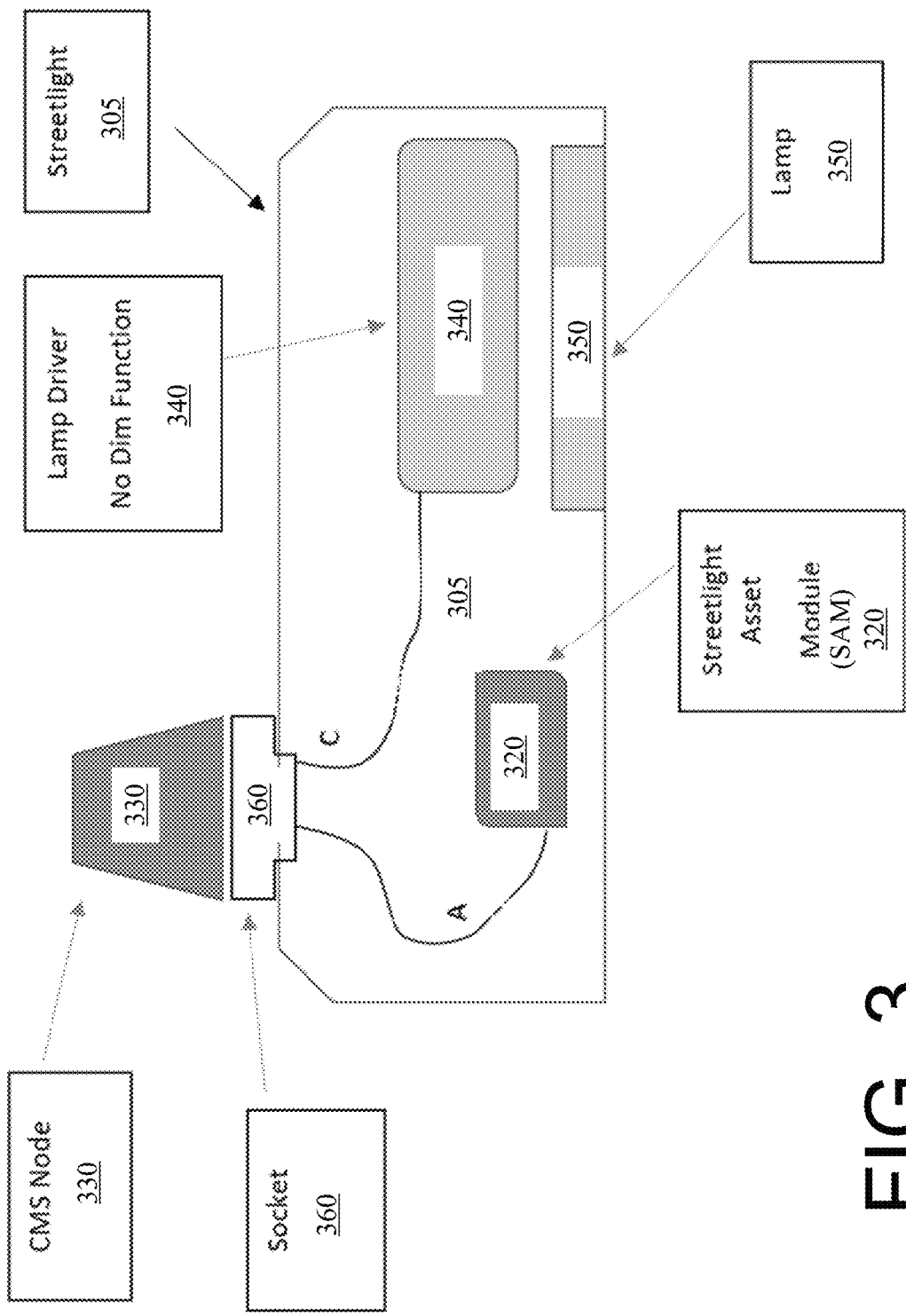
FIG. 3 is a block, diagram of a system including a SAM inside the Streetlight unit having a non-dimming lamp driver in accordance with some embodiments of the present inventive concept.

Referring first to FIG. 3, a block diagram of a SAM 320 inside the Streetlight unit 305 having a non-dimming lamp driver in accordance with embodiments of the present inventive concept will be discussed. As illustrated, the streetlight 305 includes a non-dimming lamp driver 340, a lamp 350, a SAM 320 and a socket 360. The CMS node 330 is coupled to the streetlight 305 using the socket 360. The connection to the CMS node 330 may be performed using any known type of connection without departing from the scope of the present inventive concept. Thus, FIG. 3 illustrates a basic streetlight 305 that has a lamp driver 340 that does not dim and only has a basic capability of on/off control. As will be discussed further below, even with such, a basic streetlight 305 with a lightly featured setup, SAMs 320 in accordance with embodiments discussed herein provide the streetlight information to the CMS node 330 so that the performance measured and recorded by the CMS Node 330 can be compared with the expected performance of this particular lamp type and warnings can be sent to the maintenance team if the streetlight 305 does not operate as expected.

As illustrated in FIG. 3, in the system including the CMS node 330, the socket 360, the non-dimming lamp driver 340, the lamp 350, the streetlight 305 and the SAM 320, a Dali communications connection A is provided from the CMS node 330 through the socket 360 to the SAM 320, which allows the asset data of the streetlight unit 305 that was programmed into the SAM 320 during manufacture to be read into the CMS node 330 and provided by the CMS node 330 to a customer's asset management database. The addition of the SAM 320 allows accurate performance monitoring, fault detection and location of the known asset by the CMS node 330.

As further illustrated, a connection C between the main power supply of the streetlight in the lamp driver 340 and the CMS node 330 allows power to be switched on or off by the CMS node 330. Power supply from the Mains to the to the streetlight socket 360 is not illustrated in FIG. 3.

Figure 4:
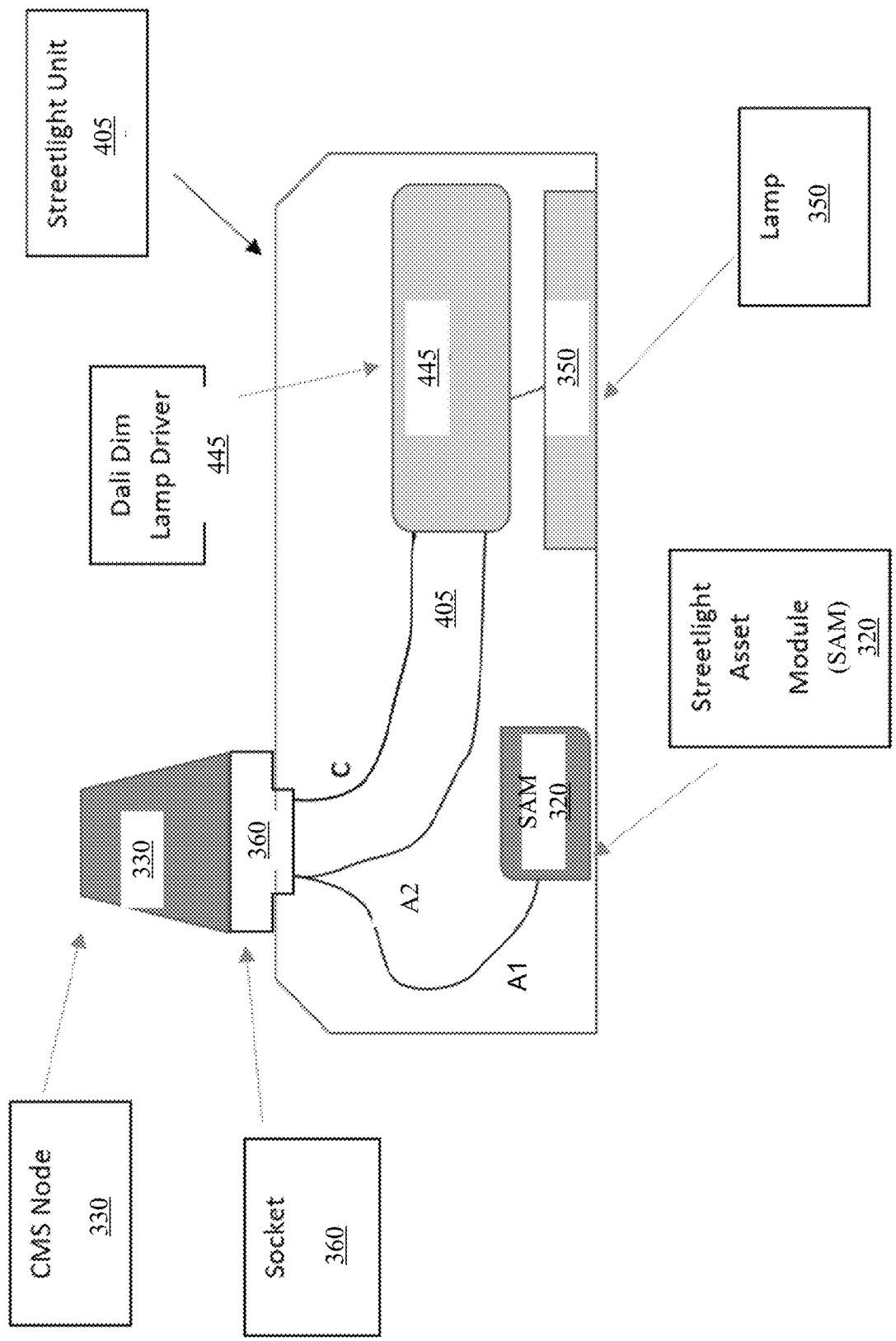
FIG. 4 is a block diagram of a system including a SAM inside the Streetlight unit having a Dali dimming lamp driver in accordance with some embodiments of the present inventive concept.

FIGS. 4 through 7 depict various alternative configurations of the streetlight that add enhancements to the basic configuration of the system illustrated in FIG. 3. Details with respect to like elements between FIG. 3 and each of FIGS. 4 through 7 may not be repeated or discussed in detail herein in the interest of brevity. Referring now to FIG. 4, a block diagram, of a system including a SAM 320 including a Dali dimming lamp driver in accordance with some embodiments of the present inventive concept will be discussed. Thus, the elements of FIG. 4 are similar to the elements of FIG. 3 except that the lamp driver 445 of FIG. 4 is Dali dimming control lamp driver in embodiments illustrated therein. Thus, the system of FIG. 4 includes the CMS node 330, the socket 360, the Dali dimming lamp driver 445, the lamp 350, the streetlight 405 and the SAM 320.

As further illustrated in FIG. 4, there are two connections from the CMS node 330. The first is a Dali communications connection A1 provided from the CMS node 330 to the SAM 320, which allows the asset data of the streetlight unit 405 that was programmed into the SAM 320 during manufacture to be read into the CMS node 330 and provided by the CMS node 330 to a customer's asset management database. The second connection A2 is between the CMS node 330 and the Dali dimming control lamp driver 445. Thus, the CMS node 330 can also be used to control the Dali dimming control of the lamp driver 445.

A connection C between the main power supply of the streetlight in the lamp driver 8 and the CMS node 1 allows power to be switched on or off by the CMS node 1. Power supply from the Mains to the to the streetlight socket is not illustrated in FIG. 2.

Figure 5:
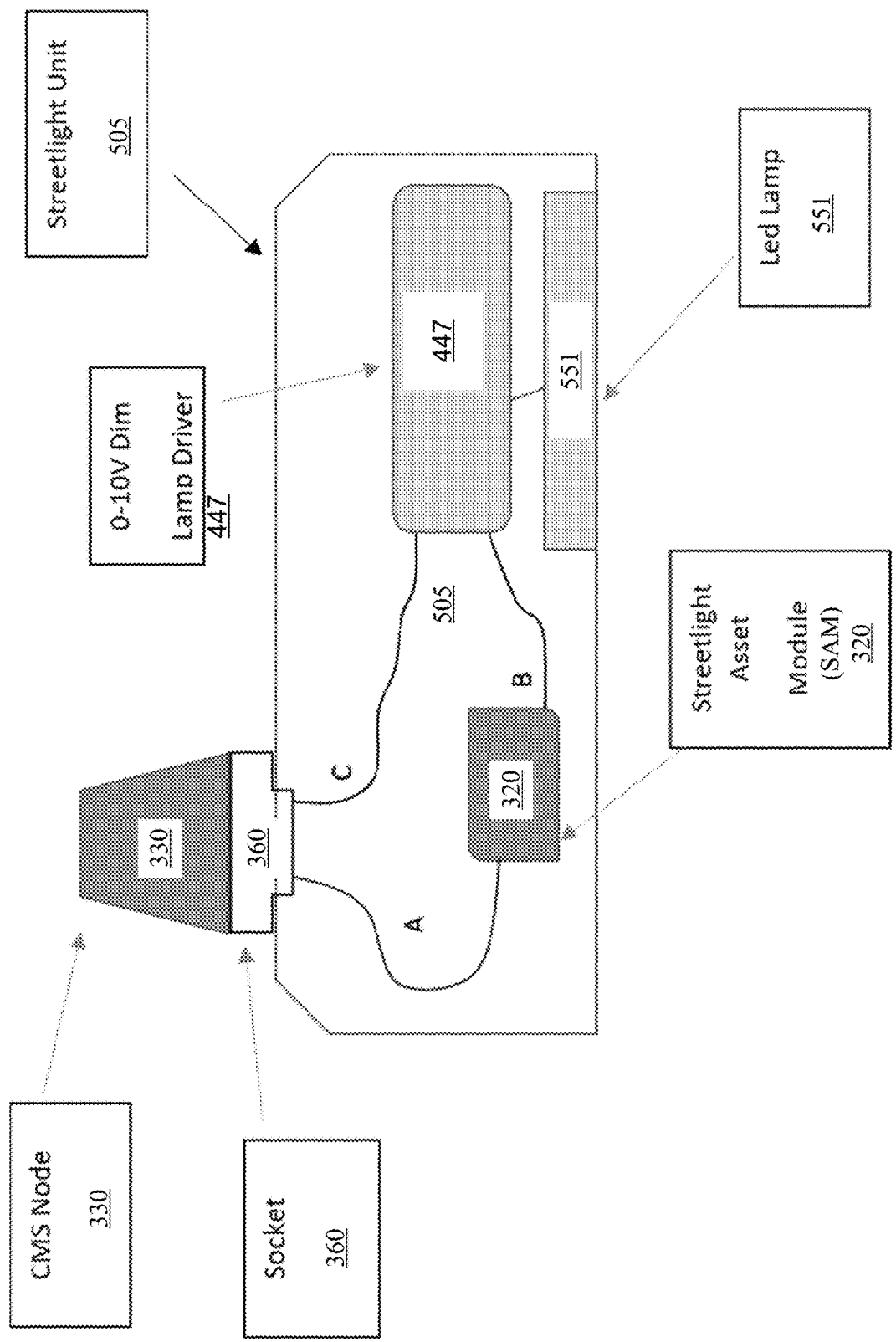
FIG. 5 is a block diagram of a system including a SAM inside the Streetlight unit having a 0-10 volt dimming lamp driver in accordance with some embodiments of the present inventive concept.

Referring now to FIG. 5, a block diagram of a system including a SAM 320 including a 0-10 volt dimming lamp driver 447 in accordance with some embodiments of the present inventive concept will be discussed. Thus, the elements of FIG. 5 are similar to the elements of FIG. 3, except that the lamp driver of FIG. 5 is a 0-10 volt dimming lamp driver 447 and the lamp is an LED lamp 551. As illustrated, in the system including, the CMS node 330, the socket 360, the 0-10V dimming lamp driver 447, the LED lamp 551, the streetlight 505 and the SAM 320, a Dali communications connection A is provided from the CMS node 330 and the SAM 320 through the socket 360, which allows the asset data of the streetlight unit that was programmed into the SAM 320 during manufacture to be read into the CMS node 330 and provided by the CMS node 330 to a customer's asset management database.

As further illustrated in FIG. 5, a connection B between the SAM 320 and the 0-10V dimming lamp driver 447 provides a 0-10V dimming control connection to adjust the power level of the lamp based on dimming commands sent to the SAM 320 from the CMS Node 330. The CMS Node 330 does not have the capability of providing both dimming control methods on the same unit.

A further connection C between the main power supply of the streetlight 505 in the lamp driver 447 and the CMS node 330 allows power to be switched on or off by the CMS node 330. Power supply from the Mains to the to the streetlight socket 360 is not illustrated in FIG. 5.

Figure 6:
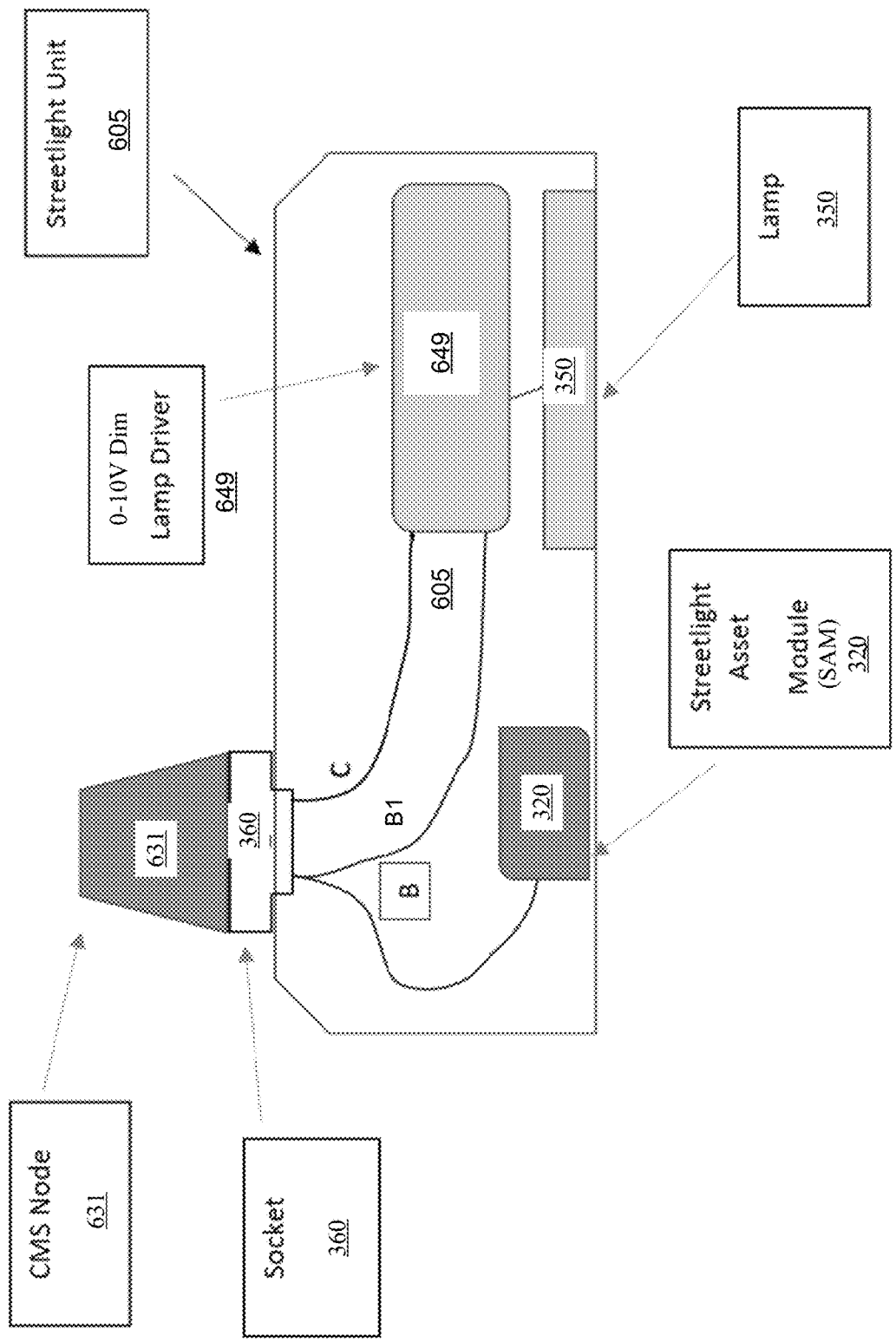
FIG. 6 is a block diagram of a system including a SAM inside the Streetlight unit having a 0-10 volt dimming lamp driver using an adaptive CMS node in accordance with some embodiments of the present inventive concept.

Referring to FIG. 6, a block diagram of a system including a SAM 320 including a 0-10V dimming lamp driver and adaptive CMS node 631 in accordance with some embodiments of the present inventive concept will be discussed. Thus, the elements of FIG. 6 are similar to the elements of FIG. 3 except that the lamp driver of FIG. 6 is 0-10V dimming control lamp driver 649 and the adaptive CNS node 631 has two connections therefrom, B and B1.

As illustrated in FIG. 6, in the system including the CMS node 330, the socket 360, the 0-10V dimming control lamp driver 649, the lamp 350, the streetlight 605 and the SAM 320, first and second connections B and B1 from the adaptive CMS node 631 to SAM 320 and lamp driver 649, respectively, allow the asset data of the streetlight unit 605 that was programmed into the SAM 320 during manufacture to be read into the CMS node 631 and provided by the CMS node 631 to a customer's asset management database. Embodiments illustrated in FIG. 6, provide an adaptive CMS Node 631, which allows the communications method to be changed from Dali to 0-10V dimming control after the asset data is collected from the streetlight asset module.

As further illustrated in FIG. 6, a connection C between the main power supply of the streetlight in the lamp driver 649 and the CMS node 631 allows power to be switched on or off by the CMS node 631. Power supply from the Mains to the to the streetlight socket is not illustrated in FIG. 6.

Figure 7:
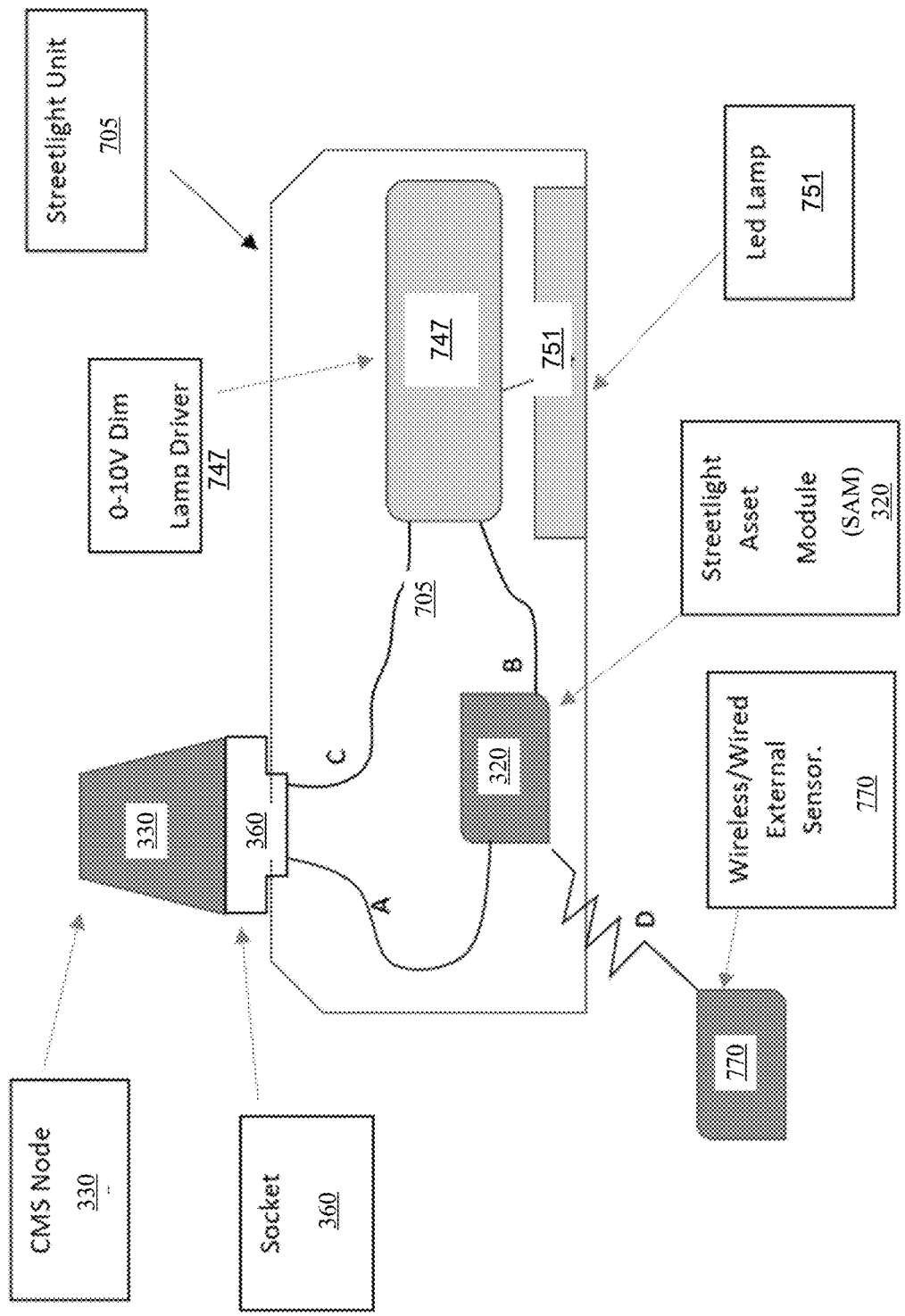
FIG. 7 is a block diagram of a system including a SAM inside the Streetlight unit having a 0-10 volt dimming lamp driver and auxiliary communications feature in accordance with some embodiments of the present inventive concept.

Referring now to FIG. 7, a block diagram of a system including a streetlight asset module including a 0-10 volt dimming lamp driver and auxiliary communications feature in accordance with some embodiments of the present inventive concept will be discussed. Thus, the elements of FIG. 7 are similar to the elements of FIG. 3 except that the lamp driver of FIG. 7 is a 0-10 volt dimming lamp driver 747, the lamp is an LED lamp 751 and the system further includes an external sensor 770.

As illustrated in FIG. 7, in the system including the CMS node 330, the socket 360, the 0-10V dimming lamp driver 747, the LED lamp 751, the streetlight 705, the SAM 320 and the wireless/wired external sensor 770, a Dali communications connection A is provided from the CMS node 330 to the SAM 320, which allows the asset data of the streetlight unit 705 that was programmed into the SAM 320 during manufacture to be read into the CMS node 330 and provided by the CMS node 330 to a customer's asset management database.

As further illustrated in FIG. 7, a connection B between the SAM 320 to the 0-10V dimming lamp driver 747 provides a 0-10V dimming control connection to adjust the power level of the lamp based on dimming commands sent to the SAM 320 from the CMS Node 330. The CMS Node 330 does not have the capability of providing both dimming control methods on the same unit.

A connection C between the main power supply of the streetlight in the lamp driver 747 and the CMS node 330 allows power to be switched on or off by the CMS node 330. Power supply from the Mains to the to the streetlight socket is not illustrated in FIG. 7.

A connection D between the SAM 320 and the wireless/wired external sensor 770 can include other communications methods to add connectivity to the Streetlight 705 for external sensors of controls using wireless, for example, Bluetooth, Zigbee, Wi-Fi or wired RS485/RS232 Modbus communications methods. These sensors 770 may include, for example, temperature sensors, traffic counters, humidity sensors, motion sensors and the like without departing from the scope of the present inventive concept.

As is clear from above, some aspects of the present inventive concept may be implemented using a data processing system. The data processing systems may be included in any of the devices discussed herein without departing from the scope of the present inventive concept. Example embodiments of a data processing system 830 configured in accordance with embodiments of the present inventive concept will be discussed with respect to FIG. 8. The data processing system 830 may include a user interface 844, including, for example, input device(s) such as a keyboard or keypad, a display, a speaker and/or microphone, and a memory 836 that communicate with a processor 838. The data processing system 830 may further include I/O data port(s) 846 that also communicates with the processor 438. The I/O data ports 846 can be used to transfer information between the data processing system 830 and another computer system or a network. These components may be conventional components such as those used in many conventional data processing systems, which may be configured to operate as described herein.

As discussed briefly above, CMS nodes are attached to or installed in many conventional streetlights. The CMS Node has measurement control and, communication circuits included therein to allow it to monitor and control the streetlight and to transmit information about the operation and performance of the streetlight back to the central control and monitoring system manager. In order to make this information more useful the manager generally needs to know what the specific configuration settings of each individual streetlight are so the expected results and the measured results can be compared, and performance of the streetlight can be calculated. In order to provide a solution to this problem of providing details on the streetlight asset in a manner that allows the CMS node to read it automatically a new ANSI (C137.4) standard is being developed. In short, this solution uses a programmable memory block inside a Dali compatible LED Driver unit to store the streetlight asset information in defined format. However, as discussed herein, many existing streetlights do not have a Dali LED driver or have a Dali capable LED Driver that does not have a programmable memory block inside. It would not be cost effective to change all the LED drivers in all exiting streetlights. Accordingly, some embodiments of the present inventive concept provide streetlight asset modules that couples to streetlights allowing streetlight information to be stored and read by the CMS node using the Dali communications.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object-oriented programming language such as Java®, Smalltalk or C++. However, the computer program code for carrying out operations of the present, inventive concept may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part below with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A streetlight asset module (SAM) comprising:
    at least one memory block configured to store operating configuration settings of a streetlight associated with the SAM,
    wherein the SAM is configured to communicate the operating configuration settings of the streetlight to a control and monitoring system (CMS) node coupled to the streetlight; and
    wherein the CMS node is configured to communicate the operating configuration settings to a remote location using a radio communications network and with a lamp driver in the streetlight, the lamp driver comprising one of a 0-10V dimming lamp driver or a Dali dimming lamp driver.

2. The SAM of claim 1, wherein the CMS node is further configured to:
    monitor operation of the streetlight associated with the SAM based on the operating configuration settings provided from the SAM; and
    provide alerts to the remote location using a communication circuit of the streetlight when a deviation from the operating configuration settings is identified.

3. The SAM of claim 1, wherein the at least one memory block is programmed with the operating configuration settings of the streetlight at time of manufacture.

4. The SAM of claim 1, wherein the operating configurations settings stored in the at least one memory block are periodically updated or updated upon request from a user.

5. The SAM of claim 1, wherein the SAM is coupled to a dimming lamp driver in the streetlight and configured to communicate dimming control commands from the CMS node to the dimming lamp driver.

6. The SAM of claim 1, wherein the SAM is coupled to at least one external sensor and is configured to provide sensor information from the at least one external sensor to the CMS node.

7. The SAM of claim 6, wherein the at least one external sensor comprises at least one of a temperature sensor, a traffic counter, a humidity sensor, or a motion sensor.

8. A streetlight comprising:
    a streetlight asset module (SAM) comprising at least one memory block configured to store operating configuration settings of the streetlight;
    a coupling mechanism configured to connect the streetlight to a control and monitoring (CMS) node,
    wherein the SAM is configured to communicate the operating configuration settings of the streetlight to the CMS node, and
    wherein the CMS node is configured to communicate the operating configuration settings to a remote location using a radio communications network; and
    a lamp driver in communication with the CMS node, the lamp driver comprising one of a 0-10V dimming lamp driver or a Dali dimming lamp driver.

9. The streetlight of claim 8, further comprising a lamp in communication with the lamp driver.

10. The streetlight of claim 9:
    wherein the lamp driver is the 0-10V dimming lamp driver and is directly coupled to the SAM, and
    wherein the SAM is configured to communicate dimming control commands from the CMS node to the 0-10V dimming lamp driver.

11. The streetlight of claim 8, wherein the CMS node is further configured to:
    monitor operation of the streetlight based on the operating configuration settings provided from the SAM; and
    provide alerts to the remote location using a communication circuit of the streetlight when a deviation from the operating configuration settings is identified.

12. The streetlight of claim 8, wherein the at least one memory block is programmed with the operating configuration settings of the streetlight at time of manufacture.

13. The streetlight of claim 8, wherein the operating configuration settings stored in the at least one memory block are periodically updated or updated upon request from a user.

14. The streetlight of claim 8, wherein the SAM is coupled to at least one external sensor and is configured to provide sensor information from the at least one external sensor to the CMS node.

15. A system for monitoring operating configuration settings of a streetlight, the system comprising:
    a streetlight asset module (SAM) comprising at least one memory block configured to store operating configuration settings of the streetlight;
    a control and monitoring (CMS) node in communication with the SAM and configured to receive the operating configuration settings of the streetlight from the SAM, wherein the CMS node is configured to communicate the operating configuration settings to a remote location using a radio communications network; and
    a lamp driver in the streetlight in communication with the CMS node, the lamp driver comprising one of a 0-10V dimming lamp driver or a Dali dimming lamp driver.

16. The system of claim 15, further comprising:
    a lamp in the streetlight in communication with the lamp driver.

17. The system of claim 16:
    wherein the lamp driver is the 0-10V dimming lamp driver and is directly coupled to the SAM, and
    wherein the SAM is configured to communicate dimming control commands from the CMS node to the 0-10V dimming lamp driver.

18. The system of claim 15, wherein the CMS node is further configured to:
    monitor operation of the streetlight based on the operating configuration settings provided from the SAM; and
    provide alerts to the remote location using a communication circuit of the streetlight when a deviation from the operating configuration settings is identified.

19. The system of claim 15, further comprising: at least one external sensor coupled to the SAM, wherein the SAM is configured to provide sensor information from the at least one external sensor to the CMS node.

20. The system of claim 15, wherein the at least one memory block is programmed with the operating configuration settings of the streetlight at time of manufacture.

* * * * *